United States Patent [19]

Leader

[11] 4,030,273
[45] June 21, 1977

[54] ROTARY CUTTING AND BAGGING MACHINE

[76] Inventor: Victor Leader, 21324 Lake George Drive NW., Cedar, Minn. 55011

[22] Filed: Jan. 28, 1976

[21] Appl. No.: 653,264

[52] U.S. Cl. .................................. 56/13.4; 56/202
[51] Int. Cl.² .................. A01D 35/22; A01D 53/06
[58] Field of Search ............ 56/202, DIG. 2, 320.2, 56/17.4, 17.5, 13.3, 13.4, 295, 16.6

[56] References Cited

UNITED STATES PATENTS

| 2,777,270 | 1/1957  | Colclazier .......................... 56/13.4 |
| 2,779,146 | 1/1957  | Mitchell et al. .................... 56/13.4 |
| 2,957,295 | 10/1960 | Brown ............................... 56/295 X |
| 2,990,666 | 7/1961  | Blume ............................ 56/202 UX |
| 3,199,277 | 8/1965  | Moody .............................. 56/16.6 |
| 3,624,989 | 12/1971 | Gatheridge ......................... 56/202 |
| 3,706,189 | 12/1972 | Rutherford ........................ 56/13.4 |
| 3,708,968 | 1/1973  | Enters et al. .................... 56/202 X |
| 3,802,173 | 4/1974  | Opitz .................................. 56/202 |
| 3,952,484 | 4/1976  | Van Swearingen .................. 56/202 |
| 3,958,401 | 5/1976  | Carpenter ..................... 56/320.2 X |

Primary Examiner—Russel R. Kinsey
Attorney, Agent, or Firm—Burd, Braddock & Bartz

[57] ABSTRACT

A rotary lawn mower having a housing with a continuous side wall and an open bottom. A motor on the housing drives a rotating cutting blade. The housing has a top with a front portion provided with an arcuate discharge opening. A discharge chute secured to the housing extends upwardly and in a rearward direction over the top of the motor. The discharge chute has a downwardly projected neck having an exit opening for discharging grass clippings and particulate materials into a disposable bag. A holder attaches the upper end of the bag to the neck. The lower end of the bag rests on a platform located between the rear wheels of the mower.

8 Claims, 17 Drawing Figures

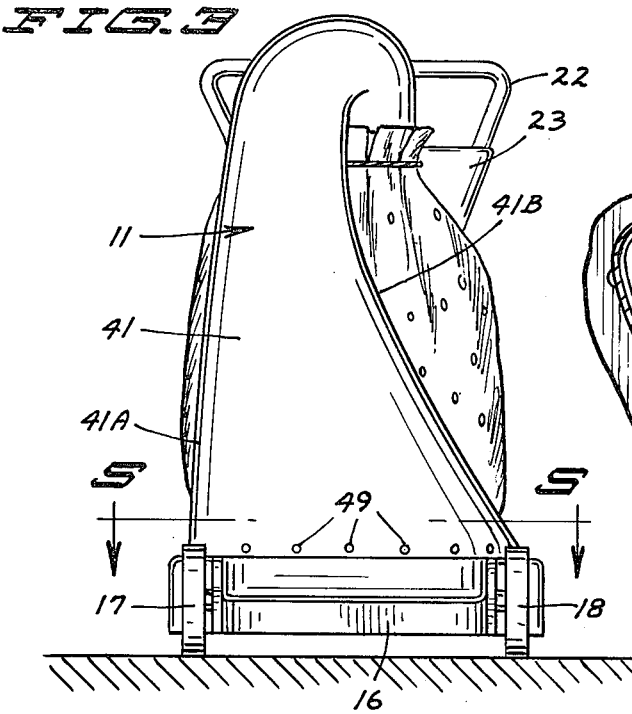
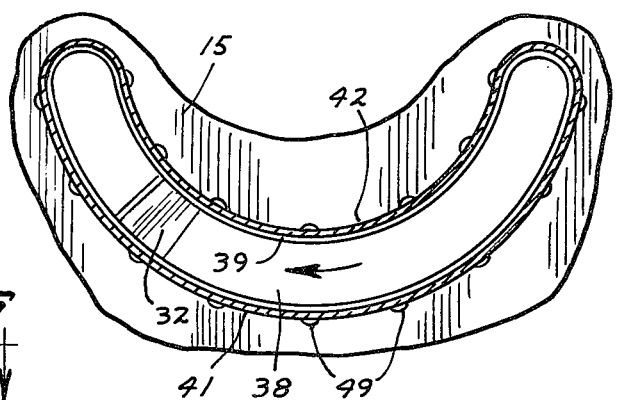
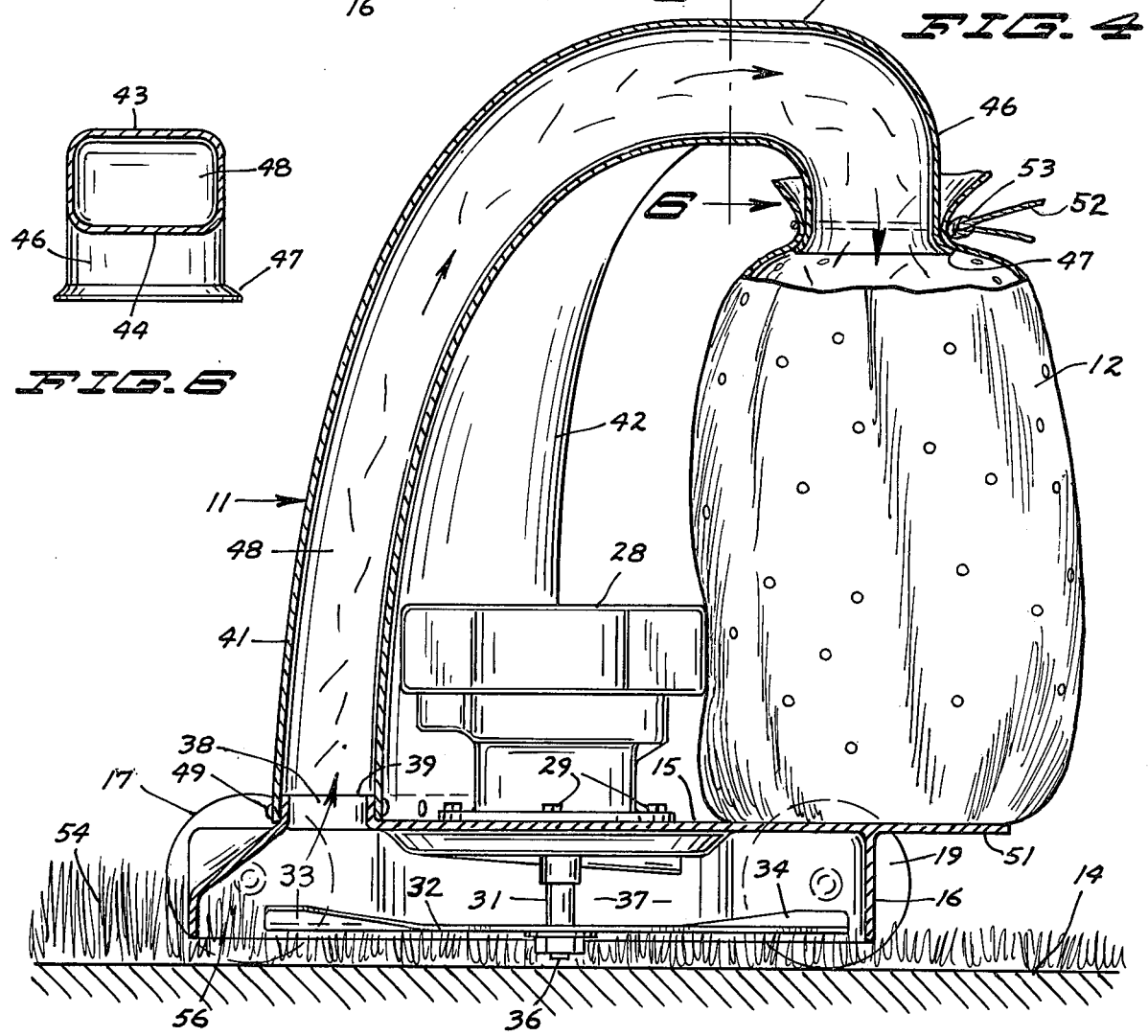

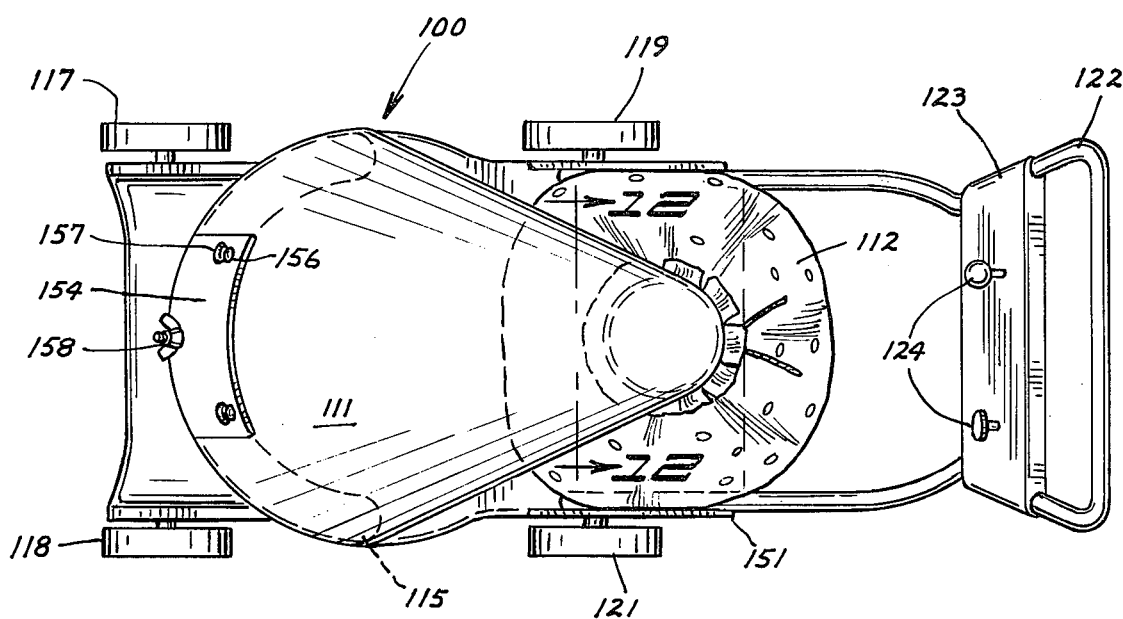

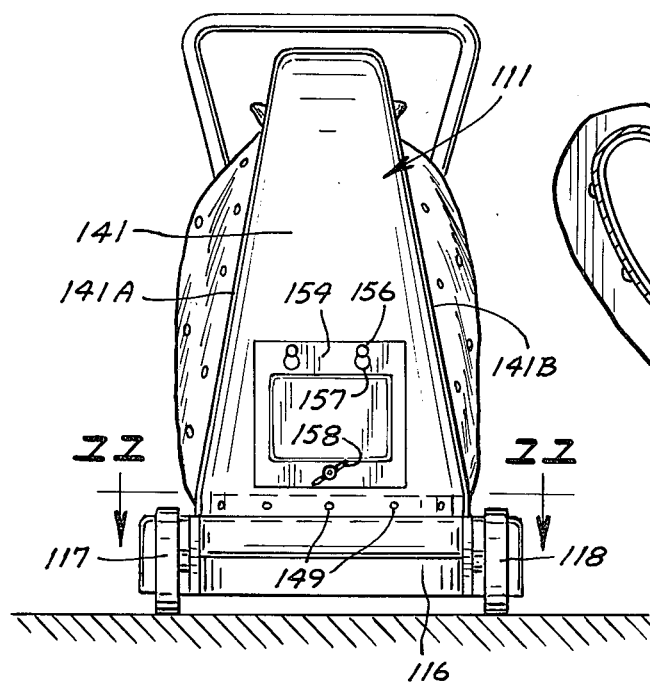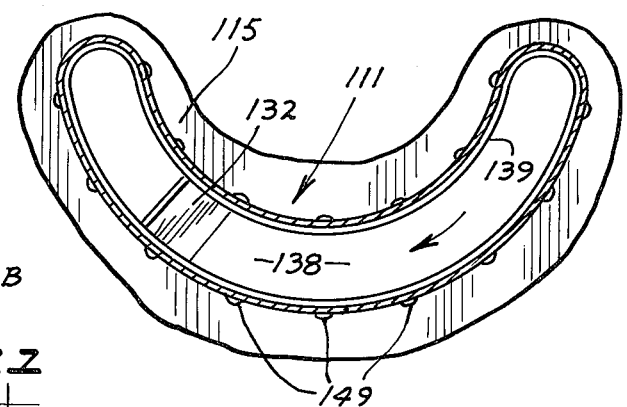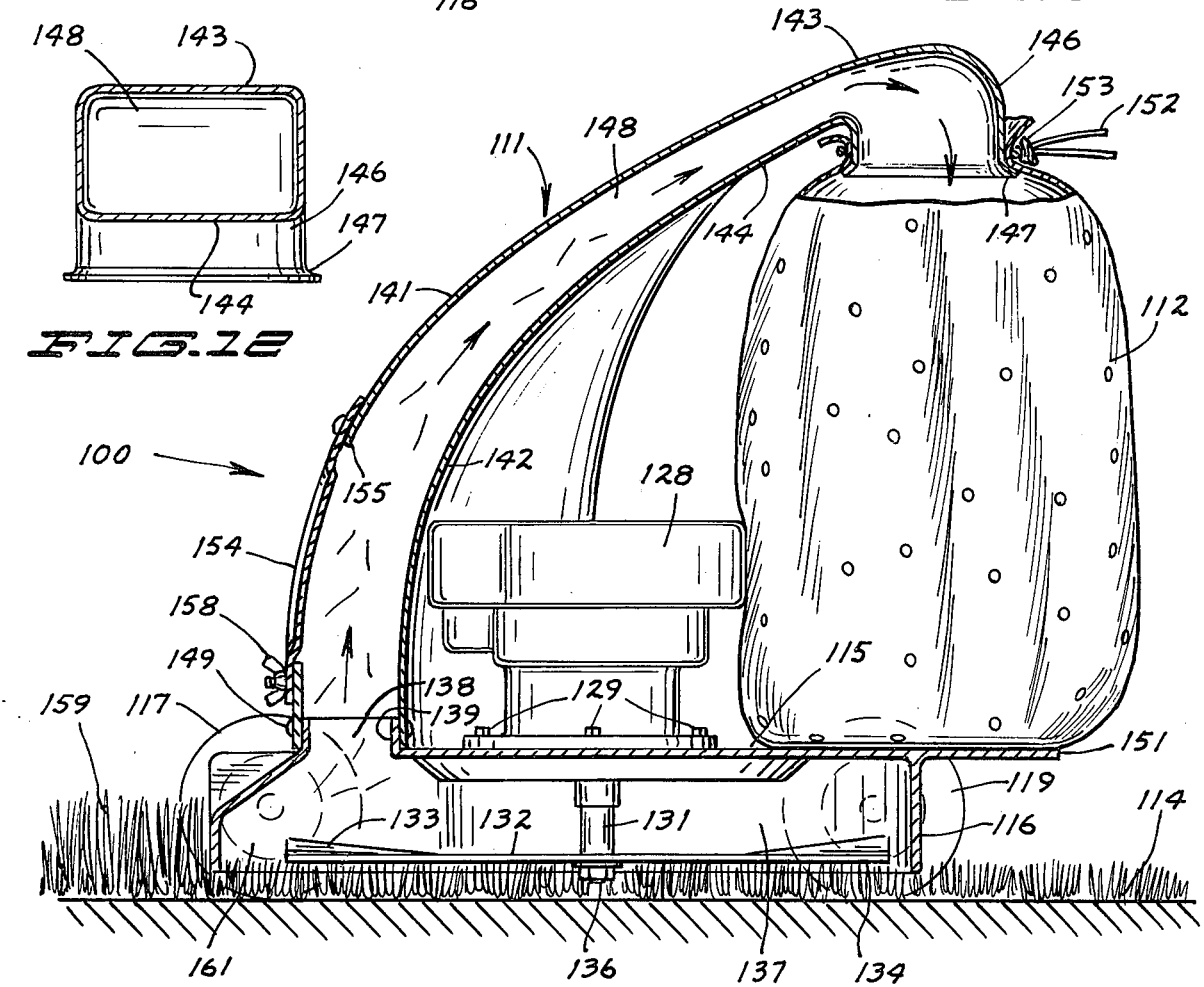

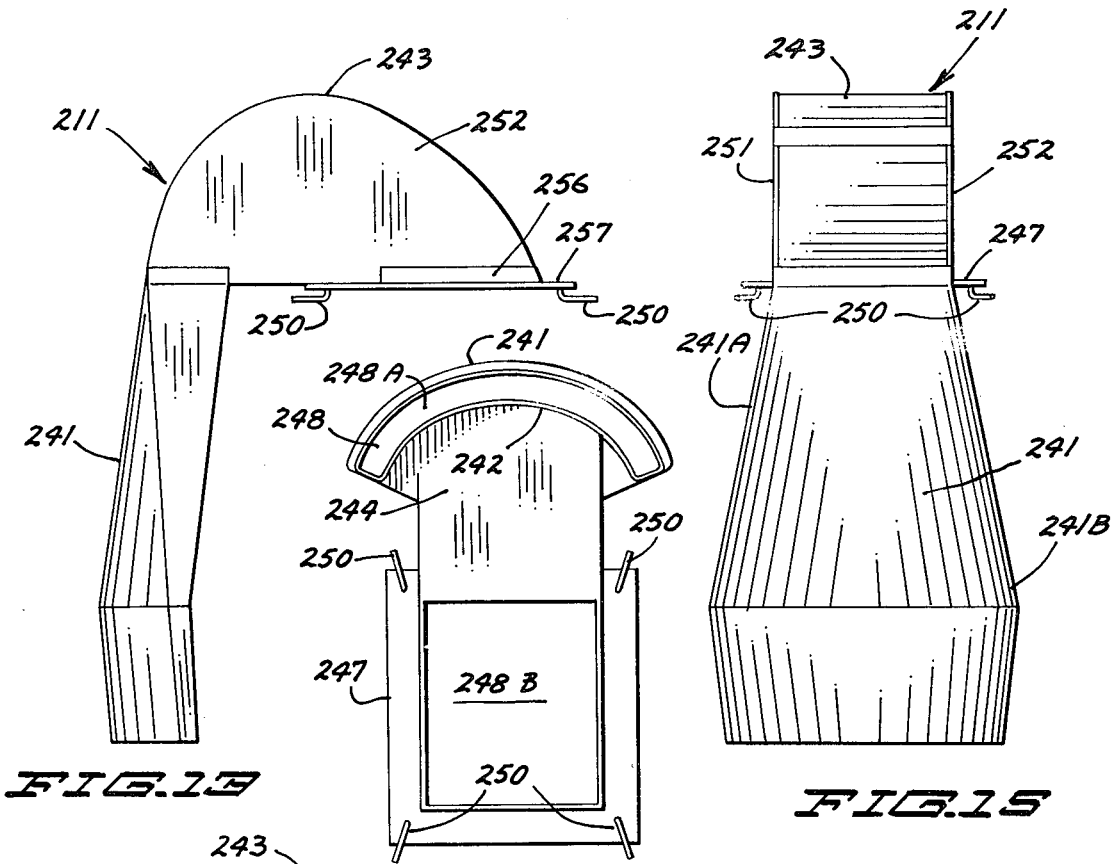
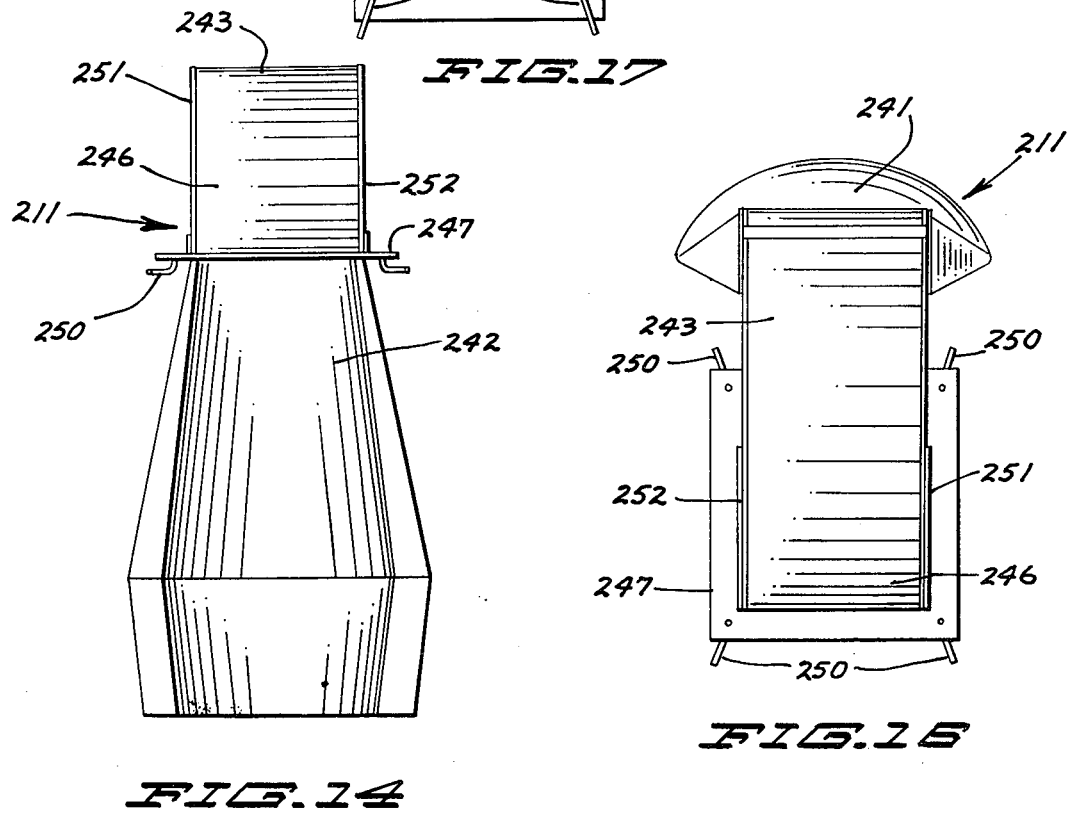

ROTARY CUTTING AND BAGGING MACHINE

BACKGROUND OF THE INVENTION

Rotary lawn mowers are equipped with various types of bagging attachments used to deliver grass clippings, leaves and the like from the mower into a collection bag. The conventional mower has a side discharge chute which delivers the materials to a generally horizontal bag located adjacent one side of the mower. Examples of this type of mower are shown by Leader in U.S. Pat. No. 3,321,293 and Dahl in U.S. Pat. No. 3,421,302. This type of bagging structure for a rotary mower interferes with the use of the mower as the bag and side discharge chute form obstructions. The horizontally disposed bag fills up from the bottom, making it difficult to completely fill the bag. The bags must be replaced and emptied, which increases the time and labor required to mow a lawn.

Several rotary mowers have been designed to discharge the clippings to the rear of the mower into a container located between the side members of the mower's handle. The chute structures associated with the mower curve around the engine and carry the materials upwardly and rearwardly into a container. Examples of this type of mower and discharge structure are shown by Moody in U.S. Pat. No. 3,199,277; Gatheridge in U.S. Pat. No. 3,624,989; and Opitz in U.S. Pat. No. 3,802,173.

SUMMARY OF THE INVENTION

The invention is directed to a rotary material cutting machine having a material carrying chute that carries the material from the front of the machine over the center of the machine into a material collection container. More particularly, the invention is directed to a rotary grass cutting lawn mower having a housing carrying a motor. The housing has a continuous side wall and a top wall having a front section containing an arcuate upwardly open discharge opening. A chute extends upwardly and rearwardly over the motor to carry the grass clippings and other particulate material from the discharge opening to the top of a material collecting bag. The housing of the mower has a rearwardly directed extension or platform located between the rear wheels of the mower. The bottom of the bag rests on the extension. A releasable holder is used to attach the top of the bag to the rear portion of the discharge chute so that the material is delivered to the top of the bag. The bag can be a disposable plastic or paper bag.

The invention includes an erection method of cutting grass. The method utilizes upwardly moving air to erect the grass before it is cut. The erected grass is uct with a rotating blade which propels the cut grass in the same direction as the moving air or upwardly toward a top discharge opening. The discharge opening is directly above the cutting zone so the grass clippings move upwardly rather than circumferentially in the chamber under the mower housing. The grass clippings move through the passage in the discharge chute upwardly and rearwardly over the motor to the top of a collection container, as a bag.

An object of the invention is to provide a rotary lawn mower with a grass catching and bagging chute that carries the grass clippings upwardly and over the center portion of the mower into the top of a large capacity bag. Another object of the invention is to provide a rotary lawn mower with a grass catching chute that is operable to fill a grass bag from the top so the bag can be filled to its maximum capacity. A further object of the invention is to provide a rotary lawn mower with a grass catching chute and a bag attached to the chute to locate the bag approximately over the center of the rear wheels of the lawn mower to provide balanced weight distribution on the mower. Yet another object of the invention is to provide a rotary lawn mower which has a grass catching chute that has a low velocity downwardly directed discharge which is safe and reliable in use. A still further object of the invention is to provide a rotary lawn mower with a grass catching chute and bag structure that is located within the housing structure so that both sides of the mower can be used to trim along objects, as fences, bushes and the like. Another object of the invention is to provide a rotary lawn mower with a housing that has a continuous downwardly directed side wall and a upwardly open front discharge chute providing for cutting the grass in an upright position and moving the cut grass and associated particulate material in an upward dirction into a discharge chute which carries the materials to the top of a bag. A further object of the invention is to provide an erection method of cutting grass which has a uniform, clean and sharp cut. These and other objects of the invention are set out in the drawings and the following detailed description.

IN THE DRAWINGS

FIG. 3 is a front elevational view of FIG. 1;

FIG. 4 is an enlarged sectional view taken along line 4—4 of FIG. 1;

FIG. 5 is an enlarged sectional view taken along line 5—5 of FIG. 3;

FIG. 6 is a sectional view taken along line 6—6 of FIG. 1;

FIG. 7 is a top plan view of a modification of the rotary lawn mower and discharge chute attached to a bag of the invention;

FIG. 8 is a side elevational view of FIG. 7;

FIG. 9 is a front elevational view of FIG. 7;

FIG. 10 is a sectional view taken along line 10—10 of FIG. 7;

FIG. 11 is an enlarged sectional view taken along line 11—11 of FIG. 9;

FIG. 12 is an enlarged sectional view taken along line 12—12 of FIG. 7;

FIG. 13 is a side elevational view of a modification of the discharge chute of the invention;

FIG. 14 is a rear elevational view of FIG. 13;

FIG. 15 is a front elevational view of FIG. 13;

FIG. 16 is a top plan view of FIG. 13; and

FIG. 17 is a bottom plan view of FIG. 13.

DESCRIPTION OF PREFERRED EMBODIMENTS

Figure 1:
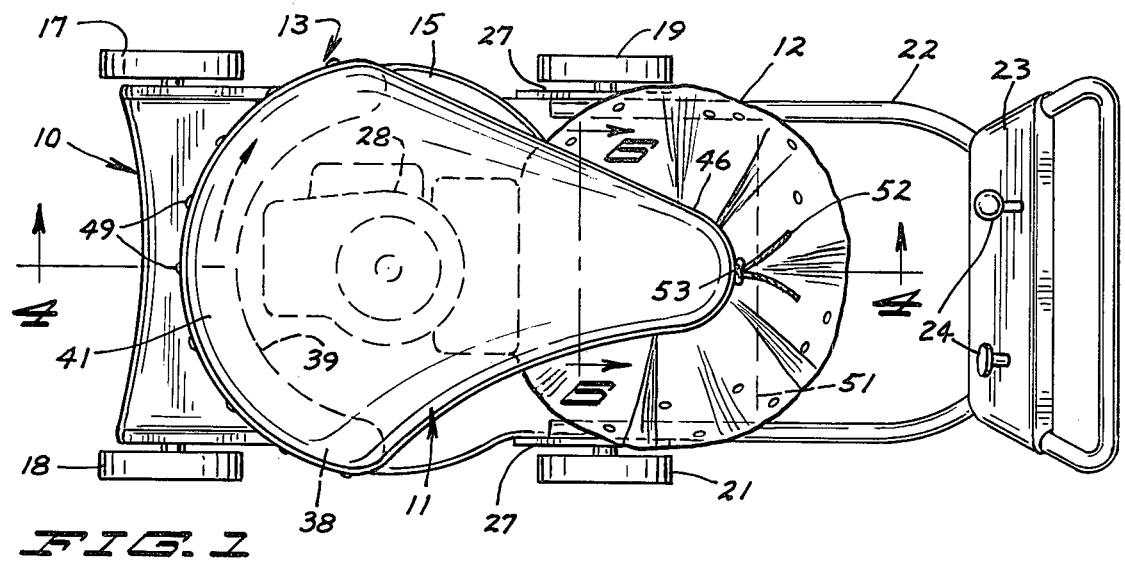
FIG. 1 is a top plan view of a rotary lawn mower equipped with the discharge chute and bag of the invention.
Figure 2:
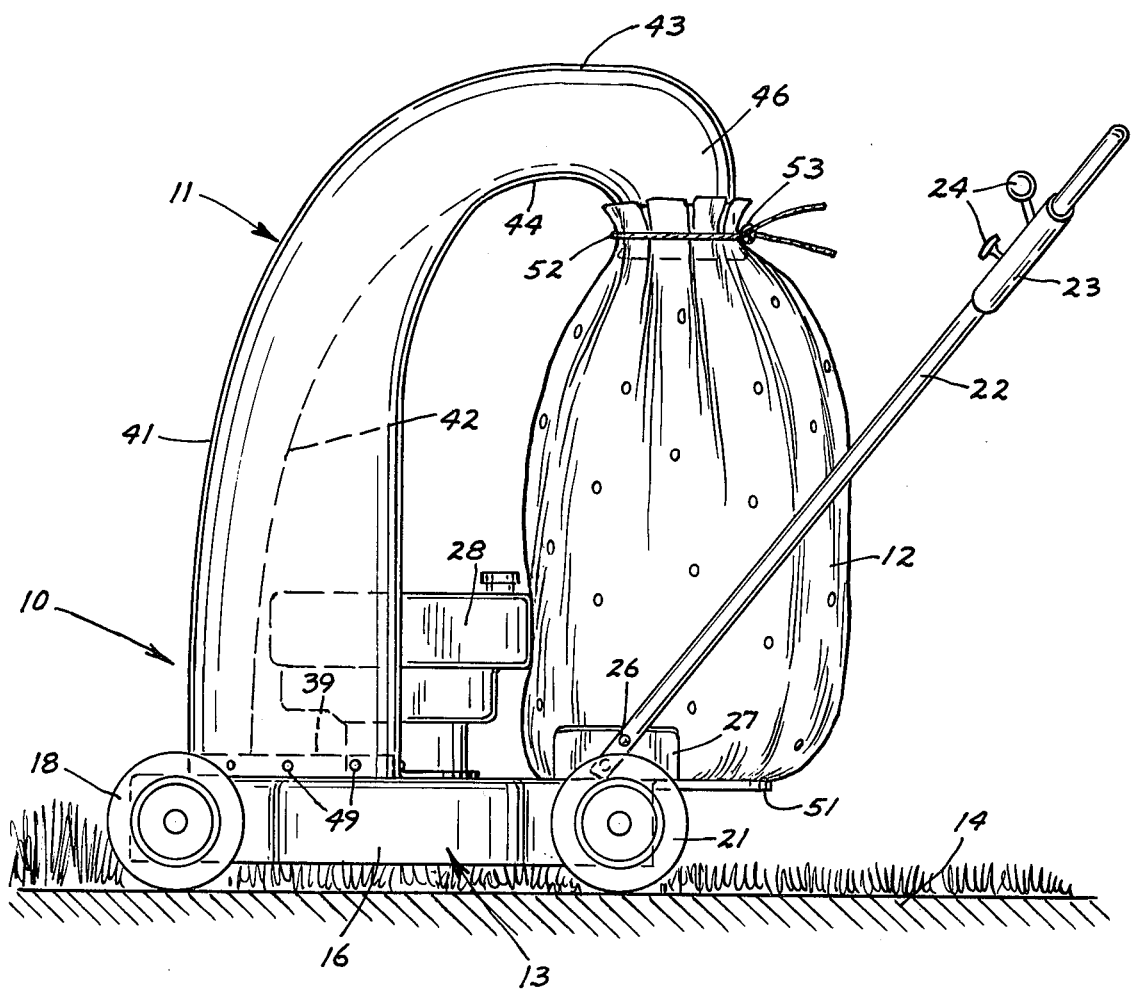
FIG. 2 is a side elevational view of FIG. 1.

Referring to FIGS. 1-4, there is shown a rotary lawn mower indicated generally at 10 equipped with bagging chute 11 for delivering material, as grass clippings, leaves and the like, to a bag or similar container 12. Bag 12 can be a disposable plastic or paper bag having air ventilating holes. Other types of containers can be used in lieu of bag 12. The lawn mower 10 has a pan-shaped housing 13 having an open bottom facing the ground 14. Housing 13 has a generally flat horizontal top wall 15 and downwardly directed continuous side wall 16. Side wall 16 is integral with the outer peripheral edge of the top wall 14 and with top wall 15 defines chamber 37. The housing 13 is movably supported on the ground with a pair of front wheels 17 and 18 rotatably mounted no opposite sides of the front of the housing and a pair of rear wheels 19 and 21 rotatably mounted on opposite sides of the rear portion of the housing. A handle 22 comprising an inverted U-shaped tubular member extends upwardly and rearwardly from housing 13. A transverse control panel 23 extends across the handle 22 and is attached thereto. Motor controls 24 are mounted on panel 23. As shown in FIG. 2, pivot member 26 pivotally mounts the lower end of handle 22 to upwardly directed bracket 27 secured to the housing 13. A similar bracket and pivot member attaches the opposite side of the handle to the housing 13.

A power unit, as in internal combustion engine or motor 28, is mounted on the center portion of housing 13 with a plurality of fasteners 29, such as nut and bolt assemblies. Motor 28 can be an electric motor or an internal combustion engine. As shown in FIG. 4, motor 28 has a downwardly directed output shaft 31. A transverse cutting blade 32 is secured to the end of shaft 31 with a nut or similar suitable fastener 36. Blade 32 has opposite end portions 33 and 34 having forward cutting edges and upwardly and rearwardly directed lift sections. Blade 32 is located in the chamber 37 defined by the top wall 15 and the continuous downwardly directed side wall 16. Continuous side wall 16 does not have holes or openings which allow grass clippings and particulate materials to escape from the sides of the housing. Wall 16 also protects the blade 32 and functions as a barrier to prevent foreign objects and the feet of the operator from being hit by the blade.

As shown in FIGS. 1 and 4, top wall 15 has an arcuate shaped exit opening 38 defined by an upwardly directed flange 39. Opening 38 extends along the front portion of housing 13 and has an arcuate length of approximately 180°. The forward end is rearward of the right front wheel 18. The rear or terminal end of opening 38 is rearward of the left front wheel 18. The ends lie generally along a transverse line passing through the center of housing 13.

The bagging chute 11 is a tubular housing having an upwardly directed convex front wall 41 and an upwardly directed concave rear wall 42. The wall 41 joins a rearwardly curved top wall 43. The wall 42 joins to a rearwardly directed bottom wall 44. Walls 42 and 43 join to a generally circular downwardly directed outlet portion or neck 46. The lower end of neck 46 has an outwardly directed annular flange 47 for accommodating a portion of the bag 12. Chute 11 has a passage 48 in communication with the outlet 38 for carrying loose material, as grass clippings and other debris, through the bagging chute 11 to the top of bag 12. The walls 41 and 42 are attached to flange 39 with suitable fasteners 49, such as nuts, bolts, rivets and the like. Other structures can be used to attach the chute 11 to the top wall 14 of the housing 13. Housing 13 and chute 11 can be a single structure made of reinforced molded plastic.

As shown in FIGS. 2 and 4, the top wall has a rearwardly directed platform or extension 51 for supporting the bottom of bag 12. The platform 51 has a generally rectangular shape and extends rearwardly of the rear side wall 16.

The open end of bag 12 releasably held on the section 46 with a cord 52 and a slip holder 52. The cord 52 extends around the bag while the holder 53 frictionally holds the ends of the cord so that the cord compresses the upper end of the bag around the section 46 above flange 47. Bag 12 can be made of a reusable material, as cloth, or can be disposable, as paper or plastic. Suitable exhaust openings are provided in the bag so that exhaust air can freely flow through the bag.

In use, referring to FIG. 4, the rotary lawn mower 10 is operable to cut the grass 54 on the rotation of blade 32. The mower 10 is moved by pushing on handle 22 to locate grass under the front wall 16 in the arcuate area 56 immediately behind the front wall 16 and in front of the blade 32. The air moving under the lower edge of the side wall 16 picks up the grass in area 56 since all of the air moves in an upward direction to the outlet 38. The side wall 16 being continuous confines the moving air to the chamber 37 and directs the air upwardly. This moving air has a vacuum cleaning action as it picks up the loose material on the grass and carries this material to the chute 11. The vertically stretched or upright elongated grass is cut by the moving blade 32. The grass clippings and loose debris move upwardly through the outlet 38 into the passage 48 of the bagging chute 11. The rotating blade 32 pumps the air upwardly and moves the air so that the grass clippings and loose particulate materials are entrained in the air and move upwardly and rearwardly through the passage 48 to the top of bag 12. The cut grass does not collect on the bottom side of the top wall 15 or the side wall 16 since the cut grass moves up through opening 38. Accordingly, the operator does not have to clean the under side of housing 13.

As shown in FIG. 4, the bag is held in an upright or vertical position. The material is forced down into the top of the bag through the downwardly directed outlet 46. The bottom of the bag 12 rests on the top wall 15 and platform 51 rearward of the motor 28. The sides of the bag 12 are free and flexible so that the bag can be filled to capacity. The material in the bag 12 is compacted due to air forcing the material in a downward direction and the up and down or vibratory movement of the material in the bag as the mower is moved over the ground 14. Also, bags of substantial capacity can be used with bagging chute 11. This minimizes the necessity of changing the bag so that greater areas of the lawn can be mowed with the use of a single bag. The neck 46, being downwardly directed, allows for gravity-type vertical filling of the bag. Any heavy particles are not propelled into the bag as they hit the rear wall of the outlet 46 before they drop down into the bag. This enables relatively lightweight and disposable bags to be attached to the outlet 46.

Referring to FIGS. 7-12, there is shown a modification of the rotary lawn mower of the invention indicated generally at 100. Mower 100 is equipped with a bagging chute 111 for carrying particulate materials, as grass clippings, leaves and the like, to a bag or container 112. Mower 100 has an inverted pan-shaped housing 113 having an open bottom facing the ground 114. Housing 113 is a one-piece rigid member of metal, plastic or the like having a generally flat horizontal top wall 115 and a continuous downwardly directed side wall 116. The side wall 116 is integral with the outer peripheral edge of the top wall 114 and defines a chamber 137, as shown in FIG. 10. A pair of front wheels 117 and 118 and a pair of rear wheels 119 and 121 rotatably support the housing 113 on the ground 114. The mower is controlled with a handle 122. Handle 122 has a transverse control panel 123. Motor controls 124 are secured to the handle 122 so that they can be conveniently regulated by the operator. As shown in FIG. 8, pivot members 126 pivotally mount the lower ends of handle 122 to upwardly directed brackets 127. The brackets 127 are secured to opposite sides of housing 113.

A power unit or motor 128, as an internal combustion engine or electric motor, is mounted on the center portion of housing 113. A plurality of fasteners 129, as nut and bolt assemblies, are used to mount the motor arm on the top wall 115.

As shown in FIG. 10, motor 128 has a downwardly directed drive shaft 131. A generally horizontal blade 132 is secured to shaft 131 with a fastener 136, such as a bolt. Blade 132 has outer end sections 133 and 134 having sharp cutting edges and upwardly and rearwardly extended extensions or lip sections. Blade 132 is located in the chamber 137 and is surrounded by the side wall 116. Side wall 116 is a continuous downwardly directed flange which does not have any holes or openings which would permit grass clippings and other particulate materials to escape from the housing. The wall 116 also functions as a barrier to protect the blade from hard objects, as rocks. The wall is also a safety shield to prevent the operator from being cut by the moving blade.

Bagging chute 111 is a curved tubular housing having an upwardly directed convex curved front wall 141 and an upwardly directed concave rear wall 142. The walls 141 and 142 shown in FIGS. 8 and 10 extend upwardly in front of motor 128 and curve rearwardly over the motor 128. Walls 141 and 142 merge into a top wall 143 and a bottom wall 144. Walls 143 and 144 are connected to a downwardly directed tubular neck or outlet 146. An outwardly directed annular flange 147 is integral with the bottom end of neck 146. The walls 141-144 of chute 111 form an enclosed passage 148 which extends from the outlet opening 138 to the outlet surrounded by the flange 147.

The lower end of chute 111 has an arcuate configuration and is located in an overlapping position relative to the flange 139. A plurality of fasteners 149, as bolts or screws, attach the chute 111 to flange 139. Other types of fasteners can be used to attach chute 111 to flange 139.

Referring to FIGS. 7 and 10, the top wall 115 behind motor 128 is joined to a generally horizontal extension or platform 151. The support 151 has a generally flat upper surface adapted to engage the bottom of the bag 112. The upper end of bag 112 is located about the neck 146. A cord 152 holds the bag 112 in engagement with the neck 146 above flange 147. A holder 153 cooperates with cord 152 to hold the cord about the neck 146. Holder 153 can be released so that the bag can be detached from the bagging chute 111 and removed from the mower. Other types of holders can be used to connect bag 112 to neck 146.

As shown in FIGS. 7, 9 and 10, the lower front part of wall 141 has a removable door 154. The door 154 closes a generally rectangular opening 155 in the lower part of front wall 141. A pair of studs 156 and a releasable fastener 158 function to hold the door 154 in assembled relation with wall 141. The door 154 has keyhole slots 157 which permit the studs 156 to hold the door on the wall 141. The door 154 is recessed or has an inwardly directed portion that is aligned with the inside surface of wall 141 so as to provide a relatively smooth surface for the material moving through the passage 148.

In use, mower 100 operates to cut the grass 159. On forward movement of the mower 100, the front wall 116 moves over grass 159, thereby locating the grass in the arcuate area 161 in front of the blade 132. The air moving under the wall 116 forces the grass to stand in an upright or erected position. Loose material is separated from the grass and carried into the chute 111. The moving air has vacuum cleaning action on the grass below housing 115. The erected grass is cut by the sharp edges of the blade 132 rotated by motor 128. The cut material, as grass clippings and other debris, that is raised by the upward movement of the air in the housing chamber 137 moves up through the arcuate front opening 138. The cut grass does not collect on the bottom of top wall 115 and side wall 116 as it moves upwardly through opening 138. The material flows from the opening 138 through passage 148 to the tubular neck 146. The neck 146 discharges the material downwardly into the central area of the bag 112. The bag fills from the bottom, with the material being compacted in the bag by the downward force of the air and the up and down vibratory movements of the bag as the mower moves over the ground. When the bag is full, the holder 153 is released. This enables the operator to remove the cord 152 and remove the bag from the mower. A new bag is attached to the outlet 156 with cord 152 and holder 153.

Referring to FIGS. 13-17, there is shown a third modification of the bagging chute of the invention indicated generally at 211. Chute 211 can be mounted on the mower 10 or 100 shown in FIGS. 1 and 7. Chute 211 is operable to receive grass clippings and the like from the discharge opening in the front top of mower housing and carry the material up and over the motor into a bag or container. The bag is adapted to be located in front of the control handle for the mower and rearward of the motor.

Bagging chute 211 has an upwardly directed convex front wall 241 and an upwardly directed concave rear wall 242. The wall 241 joins a rearwardly curved top wall 243. Wall 242 is joined with a rearwardly directed bottom wall 244. The walls define a passage 248 for carrying the material through the chute. The upper end of chute 211 has a rear neck or outlet 246. An outwardly directed flange 247 is attached to the lower end of outlet 246. The flange 247 carries a plurality of outwardly directed fingers 250. The flange 247 and fingers 250 are adapted to accommodate the mouth end of a collection bag, such as a disposable plastic or paper bag. As shown in FIG. 17, the lower or bottom end of chute 211 has an arcuate inlet opening 248A forming the inlet or mouth of passage 248. The top section of chute 211 has a downwardly facing exit opening 248B. The material moves through exit opening 248B into the top of the open bag attached to the flange 247 and fingers 250.

As shown in FIG. 15, the front wall 241 has upwardly converging side sections 241A and 241B that taper the chute 211 toward the top of the chute. The top wall 243 and bottom wall 244 are joined to generally upright side walls 251 and 252 which close the sides of the passage 248 between the walls 243 and 244.

The bagging chute 211 operates in the same manner as the bagging chute 111 to carry materials, as grass clippings, leaves and other debris, from the mower housing upwardly and rearwardly over the mower or power unit for the mower into the top of a bag.

In terms of a method of cutting grass and bagging the cut portions of the grass and loose material from the lawn, the mowers 10 and 100 perform the following steps. Before the grass is cut, it is erected or moved to an upright position. The loose material and debris on the lawn is separated from the erected grass. This is accomplished by locating the grass in the arcuate area 56 or 161 in front of housing chamber 37 or 137 below the discharge opening 38 or 138. On operation of the motor, the cutting blade 32 or 132 is rotated forcing the air in the housing chamber upward through the discharge opening 38 or 138. The air flows under the side wall 16 or 116 and rapidly moves upwardly in the chamber 37 or 137 and through the discharge opening 38 or 138. This causes rapid erection of the grass and separation of the loose material from the erected grass. The continuous side wall 16 or 116 of the housing confines the moving air to the inside chamber 37 or 137 so that the mower has a vacuum cleaning action that picks up loose material and cut grass. The grass is cut while it is in the erected position with the cutting edges of the rotating blade 32 or 132. The rotating blade, in conjunction with the rapidly moving upwardly directed air, carries the grass clippings and loose material under the housing upward through the discharge opening 38 or 138 into the passage of the discharge chute 11 or 111. The chute 11 or 111 carries the material upward and over the motor 28 or 128 to the discharge outlet or nipple 46 or 146. The nipple directs the grass clippings and material downward into the center portion of the top of the bag 12 or 112. When the bag is filled, it is removed from the nipple and replaced with an empty bag.

While there have been shown and described preferred embodiments of the lawn mower and bagging chute, as well as an erection method of cutting grass, it is understood that changes in the structure and method can be made by those skilled in the art without departing from the invention.

The embodiments of the invention in which an exclusive property or privilege is claimed are defined as follows:

1. A rotary mower and bagging chute for cutting grass and discharging the cut grass into a collection receptacle comprising a rotary mower having a housing, said housing including a top wall having front and rear portions and a continuous downwardly directed imperforate side wall extending entirely around the periphery of said top wall, motor means mounted generally centrally of said top wall and having a drive shaft extending therethrough, cutter blade means fixed to said drive shaft within said housing, said cutter blade means having lift portions for causing air and cut grass to move vertically upwardly, said front portion of said top wall having an arcuate opening substantially in alignment with said lift portions of said cutter blade means and symmetrical about the longitudinal axis of said housing, a hollow chute fixed to said top wall and extending substantially vertically upward therefrom, the lower portion of said chute having an arcuate cross-section generally complementary to the arcuate opening in said top wall, the arcuate lower portion of said chute partially surrounding said motor means, and the upper portion of said chute extending rearwardly over said motor means and communicating with a discharge opening located above said rear portion of said top wall for discharging cut grass into a collection receptacle on said rear portion, whereby the grass which has been cut by said cutter blade means is moved vertically upwardly into said lower portion of said chute without engaging said top wall and is discharged from the upper portion of said chute through said discharge opening.

2. The structure of claim 1 wherein the arcuate opening has an arcuate length of substantially 180°.

3. The structure of claim 1 wherein the upper portion of said chute terminates in a downwardly directed neck for connection to a discharge receptacle.

4. The structure of claim 1 wherein the lower portion of said chute has opposite side portions which converge in an upward direction.

5. In a rotary lawn mower having a housing with a top wall and a downwardly extending imperforate peripheral side wall, motor means located on said top wall for driving a cutter blade within said housing, said cutter blade having lift portions for causing air and cut grass to move upwardly, the improvement comprising said top wall having an arcuate opening in the front portion overlying the lift portions of said cutter blade, and symmetrical about the longitudinal axis of said housing a hollow chute mounted on said top wall, said chute having an imperforate wall structure, the lower portion of said chute defining an arcuate cross-section generally complementary to the arcuate opening in the top wall of said housing, and extending substantially vertically upward therefrom, means for mounting said lower portion of said chute on the top wall of said housing, said arcuate lower portion of said chute partially surrounding the mower motor means, the upper portion of said chute extending rearwardly over the motor means and communicating with a discharge opening located above the rear portion of said housing, whereby cut grass is moved upwardly into said chute without engaging the top wall of said housing.

6. The structure of claim 5 wherein said upper portion of said chute terminating in a downwardly directed neck in which said discharge opening is located.

7. The structure of claim 6 including an outwardly directed flange secured to said neck.

8. The structure of claim 5 wherein said lower portion of said chute includes an opening, and door means mounted on said lower portion to close the opening.

* * * * *

UNITED STATES PATENT AND TRADEMARK OFFICE
CERTIFICATE OF CORRECTION

PATENT NO. : 4,030,273
DATED : June 21, 1977
INVENTOR(S) : Victor Leader

It is certified that error appears in the above-identified patent and that said Letters Patent are hereby corrected as shown below:

Column 2, line 22, "dirction" should be --direction--.

Column 3, line 64, after "wall", insert --15--.

Column 4, line 1, after "12", insert --is--.

Column 4, line 2, "52" (second occurrence) should be --53--.

Signed and Sealed this

Fifteenth Day of November 1977

[SEAL]

Attest:

RUTH C. MASON
Attesting Officer

LUTRELLE F. PARKER
Acting Commissioner of Patents and Trademarks